United States Patent
Iacopetti

(10) Patent No.: US 6,857,847 B2
(45) Date of Patent: Feb. 22, 2005

(54) SIMPLIFIED SUPPORT DEVICE FOR NOZZLES OF A GAS TURBINE STAGE

(75) Inventor: Piero Iacopetti, Pistoria (IT)

(73) Assignee: Nuovo Pignone Holding S.p.A., Florence (IT)

( * ) Notice: Subject to any disclaimer, the term of this patent is extended or adjusted under 35 U.S.C. 154(b) by 0 days.

(21) Appl. No.: 10/452,900

(22) Filed: Jun. 3, 2003

(65) Prior Publication Data

US 2004/0033132 A1 Feb. 19, 2004

(30) Foreign Application Priority Data

Jun. 5, 2002 (IT) .................................. MI2002A1219

(51) Int. Cl.$^7$ ................................................ F01D 11/02
(52) U.S. Cl. ................. 415/115; 415/173.7; 415/174.4; 415/174.5
(58) Field of Search ........................... 415/173.7, 174.4, 415/174.5, 230, 115, 116

(56) References Cited

U.S. PATENT DOCUMENTS

| 3,275,294 | A | * | 9/1966 | Allen et al. .................. 415/115 |
| 5,215,435 | A | * | 6/1993 | Webb et al. ............. 415/173.7 |
| 5,358,374 | A | * | 10/1994 | Correia et al. .............. 415/115 |
| 6,065,928 | A | * | 5/2000 | Rieck et al. ................. 415/115 |
| 6,398,488 | B1 | * | 6/2002 | Solda et al. ................. 415/115 |

FOREIGN PATENT DOCUMENTS

GB          2127906 A  *  4/1984  .............. 415/173.7

* cited by examiner

Primary Examiner—Christopher Verdier
(74) Attorney, Agent, or Firm—Nixon & Vanderhye

(57) ABSTRACT

A simplified support device (110) for nozzles (112) of a gas turbine stage, of the type in which the support device (110) is interposed in a rotor of the gas turbine, between an upstream blading disc (122) and a downstream blading disc (124) of the nozzles (112), and is provided with honeycomb-type alveolar seals (120); the nozzles (112) of the gas turbine stage comprise an annular body which is divided into nozzle segments (112) and the honeycomb-type alveolar seals (120) are anchored directly to these nozzle segments (112).

1 Claim, 2 Drawing Sheets

SIMPLIFIED SUPPORT DEVICE FOR NOZZLES OF A GAS TURBINE STAGE

Figure 1:
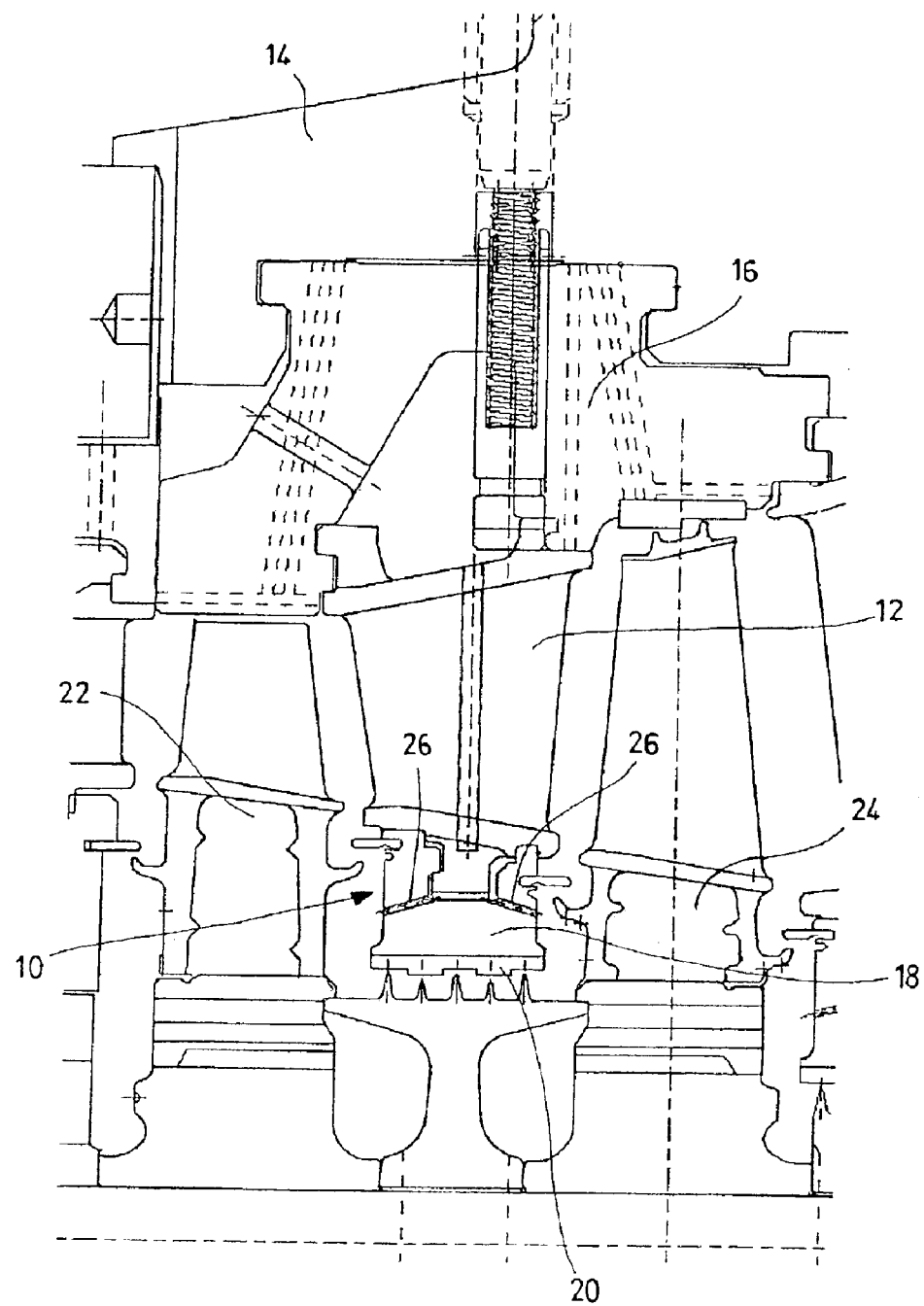

The present invention relates to a simplified support device for nozzles of a gas turbine stage.

As is known, gas turbines are machines which consist of a compressor and of a turbine with one or more stages, wherein these components are connected to one another by a rotary shaft, and wherein a combustion chamber is provided between the compressor and the turbine.

In these machines, the compressor is fed with air which is obtained from the external environment, in order to pressurise it.

The compressed air passes through a series of pre-mixing chambers, which end in a converging portion, into each of which an injector feeds fuel which is mixed with the air in order to form a fuel-air mixture to be burned.

Into the combustion chamber there is admitted the fuel, which is ignited by means of corresponding spark plugs in order to give rise to the combustion, which is designed to give rise to an increase of temperature and pressure, and thus to enthalpy of the gas.

Simultaneously, the compressor provides compressed air, which is made to pass both through the burners, and through the liners of the combustion chamber, such that the said compressed air is available to feed the combustion.

Subsequently, via corresponding pipes, the high-temperature, high-pressure gas reaches the different stages of the turbine, which transforms the enthalpy of the gas into mechanical energy available to a user.

For example, in two-stage turbines, the gas is processed in the first turbine stage in very high temperature and pressure conditions, and undergoes initial expansion there; whereas in the second stage of the turbine it undergoes a second expansion, in temperature and pressure conditions which are lower than in the previous case.

It is also known that, in order to obtain the maximum performance from a specific gas turbine, it is necessary for the temperature of the gas to be as high as possible; however, the maximum temperature values which can be obtained in use of the turbine are limited by the strength of the materials used.

A brief description is now provided of the system of stator nozzles and rotor blades of the different stages of a gas turbine according to the known art.

The first-stage nozzle is used to present the flow of burnt gases in suitable conditions at the intake of the first-stage rotor.

The nozzle assembly for the second stage of a gas turbine consists of an annular body, which in turn can be divided into nozzle segments, each segment generally consisting of nozzles which are defined or determined by foils with a corresponding wing-type profile.

This nozzle assembly for the second stage is connected on the exterior to the turbine body and on the interior to a corresponding annular support.

In this respect, it should be noted that the stators are subjected to high-pressure loads owing to the reduction of pressure between the intake and outlet of the nozzles.

In addition, the stators are subjected to high temperature gradients, owing to the flow of hot gases obtained from the combustion chamber and from the preceding stage, and to the flows of cold air which are introduced into the turbine in order to cool the parts which are subjected to the greatest stress from the thermal and mechanical points of view.

Another problem which is particularly significant in the art of gas turbines is that of separation of areas with different temperatures and pressures.

In particular, the area of internal constraint between the nozzle segments and the annular support is one of these areas.

On the gas turbines constructed hitherto, the problem has been solved with application below the nozzle of a mechanical system comprising a diaphragm-type segment and a honeycomb-type alveolar seal which is interposed in the rotor, in order to separate an upstream blading disc from a downstream blading disc of the nozzle itself.

In this known configuration, each nozzle segment, which is connected on the exterior to the body by means of segments known as shrouds, supports in its interior a diaphragm-type segment which in turn contains in its interior the honeycomb-type alveolar seal.

The diaphragm-type segments are connected to the nozzle segments by means of clasps and grooves correspondingly provided on the items. The sealing in relation to the rotor blading discs is obtained by means of foils which are embedded in the diaphragm-type segments.

The blading disc cooling system, when it exists, contains in its final section the passage for the air in holes provided in the diaphragm-type segments.

The object of the present invention is to make improvements to the known art previously described, and in particular that of providing a simplified support device for nozzles of a gas turbine stage, which permits a significant reduction of the costs.

Another object of the present invention is to provide a simplified support device for nozzles of a gas turbine stage, which permits improved cooling of the rotor blading discs.

Another object of the present invention is to provide a simplified support device for nozzles of a gas turbine stage, which is particularly reliable and functional.

This object and others according to the present invention are achieved by providing a simplified support device for nozzles of a gas turbine stage, as described in claim 1.

Further characteristics are described in the successive claims.

Figure 2:
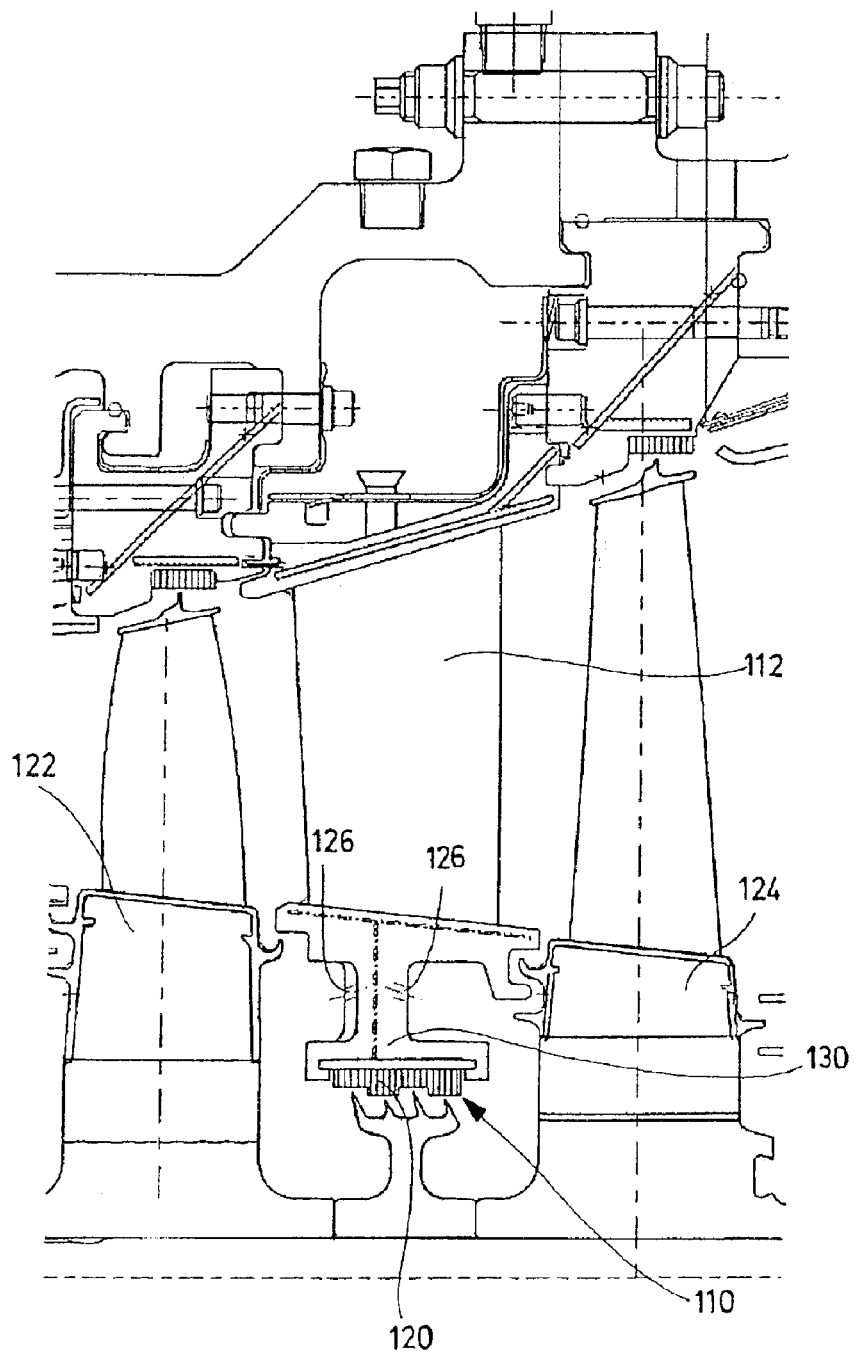

The characteristics and advantages of a simplified support device for nozzles of a gas turbine stage according to the present invention will become clearer and more apparent from the following description, provided by way of non-limiting example, with reference to the attached schematic drawings, in which:

FIG. 1 is a cross-section of a support device for nozzles of a gas turbine stage, as known according to the existing art; and FIG. 2 shows a cross-section of a simplified support device for nozzles of a gas turbine stage, according to the present invention.

FIG. 1 shows a support device, which is indicated as 10 as a whole, for nozzles 12 of a gas turbine stage, and is interposed in a rotor of the gas turbine itself in order to separate an upstream blading disc 22 from a downstream blading disc 24 of the nozzle 12 itself.

The nozzles 12 of a gas turbine stage comprise an annular body, which in turn can be divided into nozzle segments 12.

Each nozzle segment 12, which is connected on the exterior to a gas turbine body 14 by means of segments known as shrouds 16, is supported in its interior by the support device 10.

This support device 10 comprises a diaphragm-type segment 18, which is connected to the nozzle segments 12 by means of clasps and grooves which are arranged correspondingly on the items, and a honeycomb-type alveolar seal 20, which is provided inside the diaphragm-type segment 18.

The sealing relative to the rotor blading discs 22 and 24 is obtained by means of foils which are embedded in the diaphragm-type segments 18.

In the diaphragm-type segments 18 there can also be provided cooling holes 26 for air which cools the upstream 22 and downstream 24 blading discs.

FIG. 2 illustrates a simplified support device according to the present invention, which is indicated as a whole as 110, for nozzles 112 of a gas turbine stage, wherein the components which are the same as/equivalent to those illustrated in FIG. 1 of the known art have the same reference numbers increased by 100.

In the example illustrated, according to the present invention, the simplified support device 110 comprises substantially an annular honeycomb-type alveolar seal 120. This alveolar seal 120 is anchored directly to a lower platform 130 of the nozzle segments 112, without including diaphragm-type segments.

In the nozzles 112, and in particular in the vicinity of the lower platform 130 of the nozzle segment 112, there can also be provided cooling holes 126 for air which cools the upstream 122 and downstream 124 blading discs.

The solution with the simplified support device 110, which for example is used for the nozzles 112 of the second stage of a low-pressure gas turbine, is undoubtedly more economical than that with the support device 10 according to the known art, and simultaneously the efficiency of washing of the blading discs 122 and 124 is improved, since the losses caused by blow-by are decreased.

The description provided makes apparent the characteristics of the simplified support device which is the subject of the present invention, for nozzles of a gas turbine stage, and also makes apparent the corresponding advantages, which, it will be remembered, include:

simple and reliable usage;

substantial reduction in the production costs;

facilitated maintenance.

Finally, it is apparent that many modifications and variations, all of which come within the scope of the invention, can be made to the simplified support device thus designed for nozzles of a gas turbine stage; in addition, all the details can be replaced by technically equivalent elements. In practice, any materials, forms and dimensions can be used, according to the technical requirements.

The scope of protection of the invention is thus delimited by the attached claims.

What is claimed:

1. A simplified support device for nozzles of a gas turbine having a rotor spaced radially from the surrounding nozzles, said support device being interposed between the rotor and the nozzles and between an upstream blading disc and a downstream blading disc, said support device being provided with honeycomb alveolar seals, said nozzles comprising an annular body divided into nozzle segments, said honeycomb alveolar seals being anchored directly to a lower platform of said nozzle segments by axially reduced portions of the nozzle segments, said axially reduced portions having cooling holes for conveying cooling air supplied through the nozzle segments in axially forward and aft directions for cooling said upstream blading discs and downstream blading discs, respectively.

* * * * *

UNITED STATES PATENT AND TRADEMARK OFFICE
CERTIFICATE OF CORRECTION

PATENT NO. : 6,857,847 B2
DATED : February 22, 2005
INVENTOR(S) : Iacopetti, P.

It is certified that error appears in the above-identified patent and that said Letters Patent is hereby corrected as shown below:

Column 2,
Line 34, the paragraph beginning with "This object and others..." should be deleted.

Signed and Sealed this

Fifth Day of July, 2005

JON W. DUDAS
*Director of the United States Patent and Trademark Office*